United States Patent [19]

Roberts

[11] Patent Number: 4,950,059
[45] Date of Patent: Aug. 21, 1990

[54] COMBINATION LAMP AND INTEGRATING SPHERE FOR EFFICIENTLY COUPLING RADIANT ENERGY FROM A GAS DISCHARGE TO A LIGHTGUIDE

[75] Inventor: Victor D. Roberts, Burnt Hills, N.Y.

[73] Assignee: General Electric Company, Schenectady, N.Y.

[21] Appl. No.: 256,019

[22] Filed: Oct. 11, 1988

[51] Int. Cl.$^5$ .................. G02F 1/133; H01J 11/00; H01J 61/30; F21V 7/04

[52] U.S. Cl. ................... 350/345; 313/567; 313/634; 313/639; 362/32; 362/263; 362/296; 362/347

[58] Field of Search ............. 350/345; 362/32, 296, 362/297, 263, 347, 350; 313/567, 634, 639, 637

[56] References Cited

U.S. PATENT DOCUMENTS

| | | | |
|---|---|---|---|
| 3,636,396 | 1/1972 | Gruzdev et al. | 313/567 |
| 4,001,631 | 1/1977 | McNeill et al. | 313/567 |
| 4,001,632 | 1/1977 | Haugsjaa et al. | 313/567 |
| 4,097,130 | 6/1978 | Cole, Jr. | 350/335 |
| 4,128,313 | 12/1978 | Cole, Jr. et al. | 350/340 |
| 4,581,608 | 4/1988 | Aftergut et al. | 340/704 |
| 4,705,987 | 11/1987 | Johnson | 313/639 |
| 4,735,495 | 4/1988 | Henkes | 350/345 |
| 4,765,718 | 8/1988 | Henkes | 350/345 |
| 4,859,906 | 8/1989 | Ury et al. | 313/639 |

FOREIGN PATENT DOCUMENTS

| | | | |
|---|---|---|---|
| 0141165 | 11/1981 | Japan | 313/567 |
| 8600685 | 1/1986 | PCT Int'l Appl. | 362/347 |
| 2198867 | 6/1988 | United Kingdom | 350/345 |

Primary Examiner—Stanley D. Miller
Assistant Examiner—Anita Pellman Gross
Attorney, Agent, or Firm—Jill M. Breedlove; James C. Davis, Jr.; Marvin Snyder

[57] ABSTRACT

A collimated light source is provided which combines the functions of lamp and integrating sphere into one unit for efficiently coupling radiant energy from a gas discharge to a lightguide. The light source is electrodeless and comprises an integrating sphere coated with a light-reflective material and containing a gaseous fill. To excite a discharge current in the fill, the sphere is encircled by a coupling coil driven by an RF power source, or the sphere is enclosed in a microwave cavity. Light exits from the sphere through a light-transmissive window to a lightguide.

30 Claims, 4 Drawing Sheets

COMBINATION LAMP AND INTEGRATING SPHERE FOR EFFICIENTLY COUPLING RADIANT ENERGY FROM A GAS DISCHARGE TO A LIGHTGUIDE

The U.S. Government has a paid-up license in this invention and the right in limited circumstances to require the patent owner to license others on reasonable terms as provided for by the terms of contract No. F33615-85-C-1787 awarded by the U.S. Air Force.

Field of the Invention

The present invention relates generally to collimated light sources. More particularly, this invention relates to an electrodeless discharge lamp which is used to efficiently couple radiant energy from a gas discharge to a lightguide.

Background of the Invention

Although apparatus for coupling lamps to lightguides are well-known, the presently available coupling schemes are inefficient due to light losses associated with lamp components (such as leads, electrodes and envelopes) and supporting structure. In particular, the lamp components and supporting structure are located in the optical path and, therefore, absorb some of the generated light. It would be advantageous to be able to increase the efficiency of such apparatus, especially in consideration of the ever-increasing number of applications therefor.

Specifically, one application for a system comprising a light source coupled to a lightguide is the illumination of a liquid crystal display. Flat panel liquid crystal displays, particularly of the type having individual pixels arranged in a two-dimensional matrix in an orthogonal row and column format, are well-known.

One such system is disclosed in U.S. Pat. No. 4,735,495, issued Apr. 5, 1988 to John L. Henkes and assigned to the assignee of the present invention. The above-identified patent, which is hereby incorporated by reference, describes a collimated light source including a high intensity discharge lamp positioned within an integrating sphere. A tapered light pipe or an array of tapered light pipes is coupled to the integrating sphere. In operation, uncollimated light exiting from the integrating sphere is collimated by internal reflection(s) in the light pipe(s), and, thus, collimated light is emitted from the light pipe(s) for illuminating a liquid crystal display.

The light source of the above-identified patent exhibits an offset of the collimated light toward the edges of the light pipes. Light thus extending beyond the active area of the liquid crystal display is not utilized and can therefore have a limiting effect on the maximum contrast ratio of the display.

In U.S. Pat. No. 4,765,718, issued Aug. 23, 1988 to John L. Henkes and assigned to the assignee of the present invention, and which is hereby incorporated by reference, compensation for the above-described offset is provided by a secondary collimator comprising crossed cylindrical lenses. Efficiency of the system is thereby improved. However, the efficiency can be increased further by avoidance of light losses caused by absorption of light by lamp components and supporting structure.

Objects of the Invention

It is, therefore, an object of the present invention to provide a new and improved light source which efficiently couples radiant energy from a lamp to a lightguide.

Another important object of this invention is to provide a new and improved light source which combines the functions of lamp and integrating sphere into one unit, thus eliminating the light losses associated with lamp components and supporting structure.

Still another object of the present invention is to provide a new and improved light source which efficiently couples light from a gas discharge to a lightguide in order to illuminate a liquid crystal display.

Summary of the Invention

These and other objects of the present invention are achieved by a new, highly efficient collimated light source, or lamp, useful for coupling radiant energy from a gas discharge to a lightguide. In accordance with the invention, the new lamp is electrodeless and comprises an evacuative, light-integrating, closed container for enclosing a gaseous fill, such as mercury vapor. The container of the preferred embodiment comprises an integrating sphere which has a light-transmissive window for receiving a lightguide and further includes a light-reflective coating on either its interior or its exterior surface. Although the window allows for the passage of light therethrough, it functions to retain the fill within the sphere. Those skilled in the art will appreciate that the term "light", as used herein, is intended to encompass not only visible radiation, but also infrared and ultraviolet radiation.

In the preferred embodiment, a coupling coil, which is driven by a radio frequency power amplifier or oscillator, is wrapped around the integrating sphere. Radio frequency current flowing in the coupling coil produces an alternating magnetic field which, in turn, induces an electric field to drive a radio frequency discharge current in the gaseous fill of the lamp.

An alternate embodiment of the new discharge lamp is energized by a microwave energy source, such as a klystron or a magnetron. For example, the lamp may include a microwave waveguide which transmits microwave energy from the microwave energy source to the lamp. Alternatively, the integrating sphere may be contained within a resonant microwave cavity which is coupled to a source of microwave power via a coaxial cable or a microwave waveguide. Moreover, according to this invention, the resonant cavity itself may function as the integrating sphere and, thus, as part of the lamp. In instances for which microwave coupling is used, the lightguide which transmits light from the gas discharge is encased by an electrically conducting material having a sufficiently small cross-sectional opening in order to prevent microwave energy from propagating through the lightguide.

The features and advantages of the present invention will become apparent from the following detailed description of the invention when read with the accompanying drawings.

Detailed Description of the Invention

Figure 1:
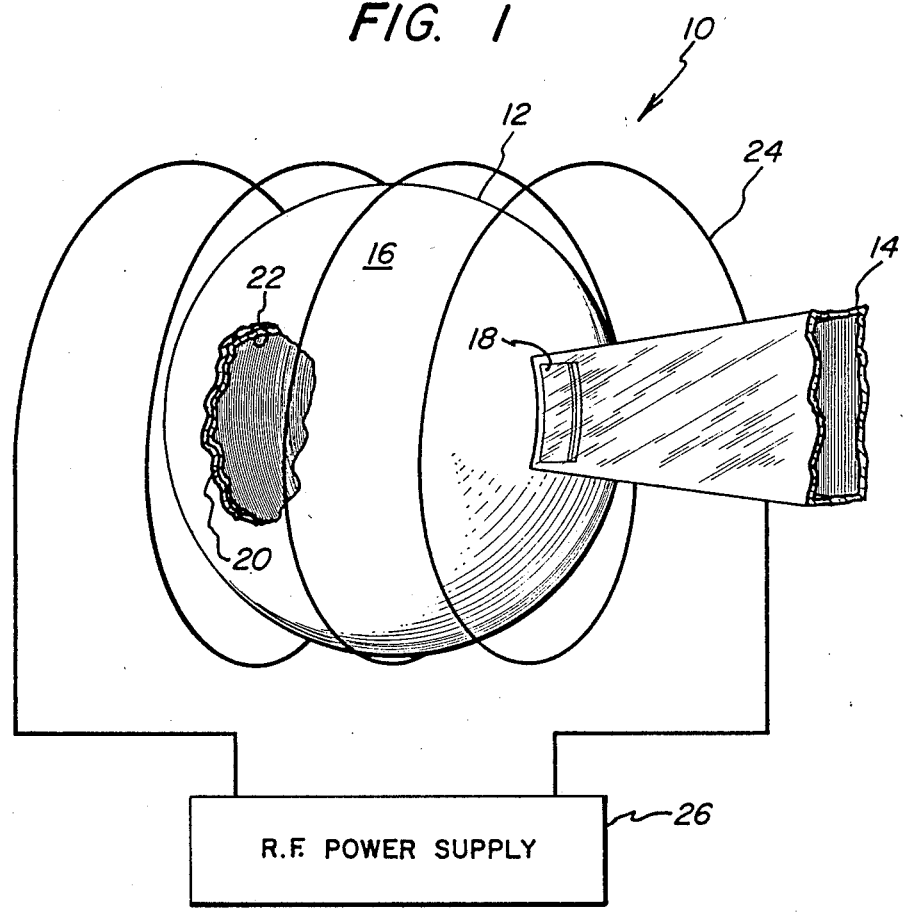
FIG. 1 is a perspective view of the preferred embodiment of the collimated light source of the present invention.

With reference to FIG. 1, the preferred embodiment of the collimated light source of the present invention is shown, generally designated by the numeral 10. Light source 10 comprises an electrodeless lamp 12 coupled to a lightguide 14, which is shown in FIG. 1 as an elongated, tapered light pipe. As illustrated, the light pipe is tapered in both the horizontal and vertical directions in order to collimate the emitted light along orthogonal axes. The principles of this invention equally apply to other types of lightguides, such as an array of light pipes or the like.

Electrodeless lamp 12 comprises a light-integrating, closed container or envelope 16 having a light-transmissive window 18 in registry with the narrow end of a light-transmissive lightguide 14. In the preferred embodiment, container or envelope 16 comprises an integrating sphere, but any suitably shaped envelope may be used. For example, the envelope may be cylindrical, ellipsoid, boxlike, or any shape which is appropriate for a particular application. More specifically, in the preferred embodiment, integrating sphere 16 comprises an electrically insulating evacuative shell 20, such as glass or quartz, with an interior coating 22 over its entire inner surface (except at window 18) comprised of a light-reflective material, such as magnesium oxide. The light-reflective coating, alternatively, may comprise a metal such as copper, aluminum, silver or gold. Still another embodiment includes an interior coating of tetrafluoroethylene resins. Although the above-described materials suitable for light-reflective coatings all exhibit the characteristic of broad band reflectivity, a material which reflects light in only a narrow range of wavelengths may be used, such as a multi-layer dielectric coating, if light output in essentially only that range of wavelengths is desired.

Integrating sphere 16 contains a fill comprising a gas which, when energized, emits a substantial portion of its radiation in a desired range of wavelengths. For example, if the desired spectral output lies in the range of from 500 to 600 nanometers, then mercury vapor or sodium vapor would be suitable. Specifically, mercury exhibits strong emission lines at 546, 577 and 579 nanometers, while sodium has strong emission lines at 589 and 589.6 nanometers.

Figure 2:
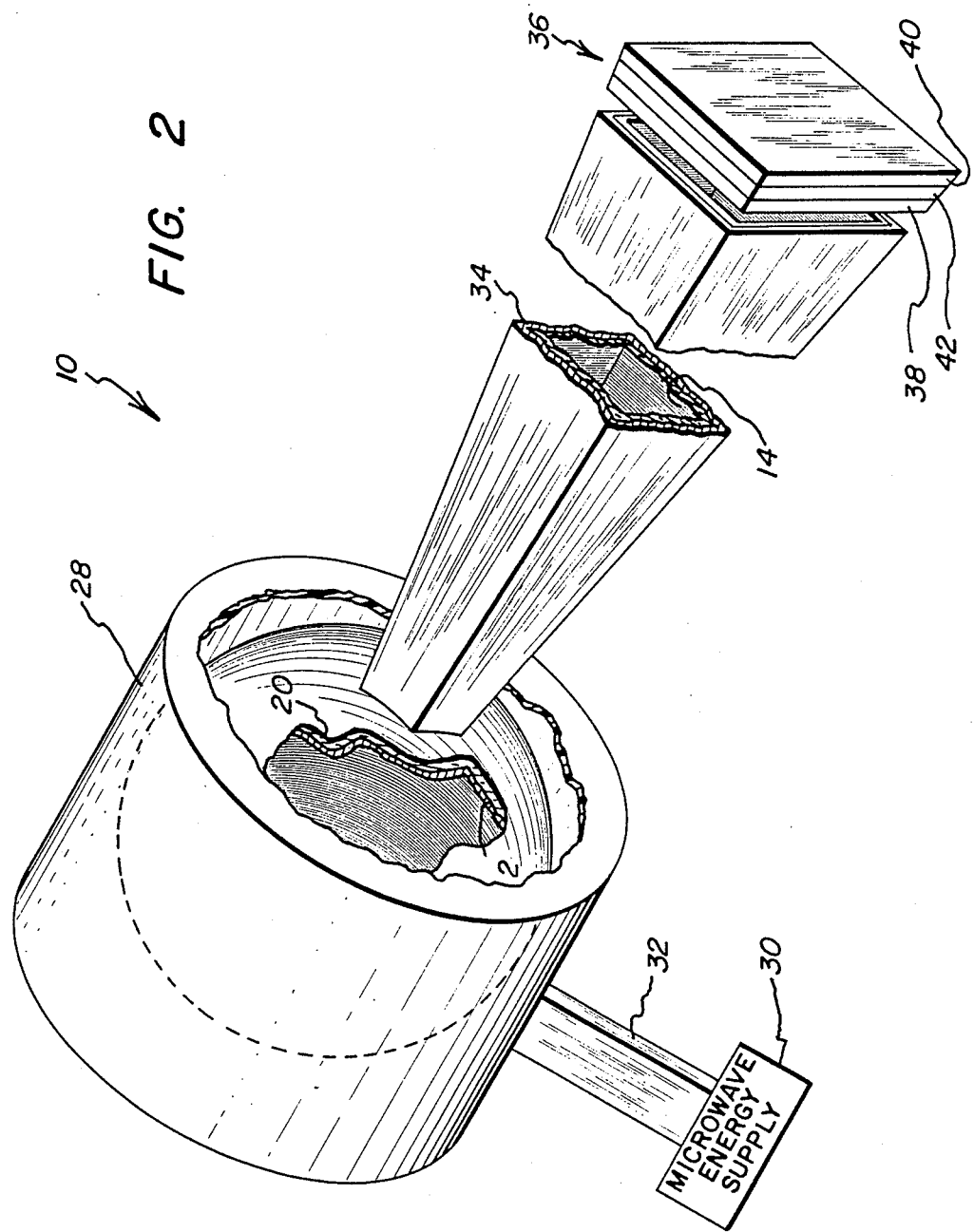
FIG. 2 is alternate embodiment of the collimated light source of FIG. 1.
Figure 3:
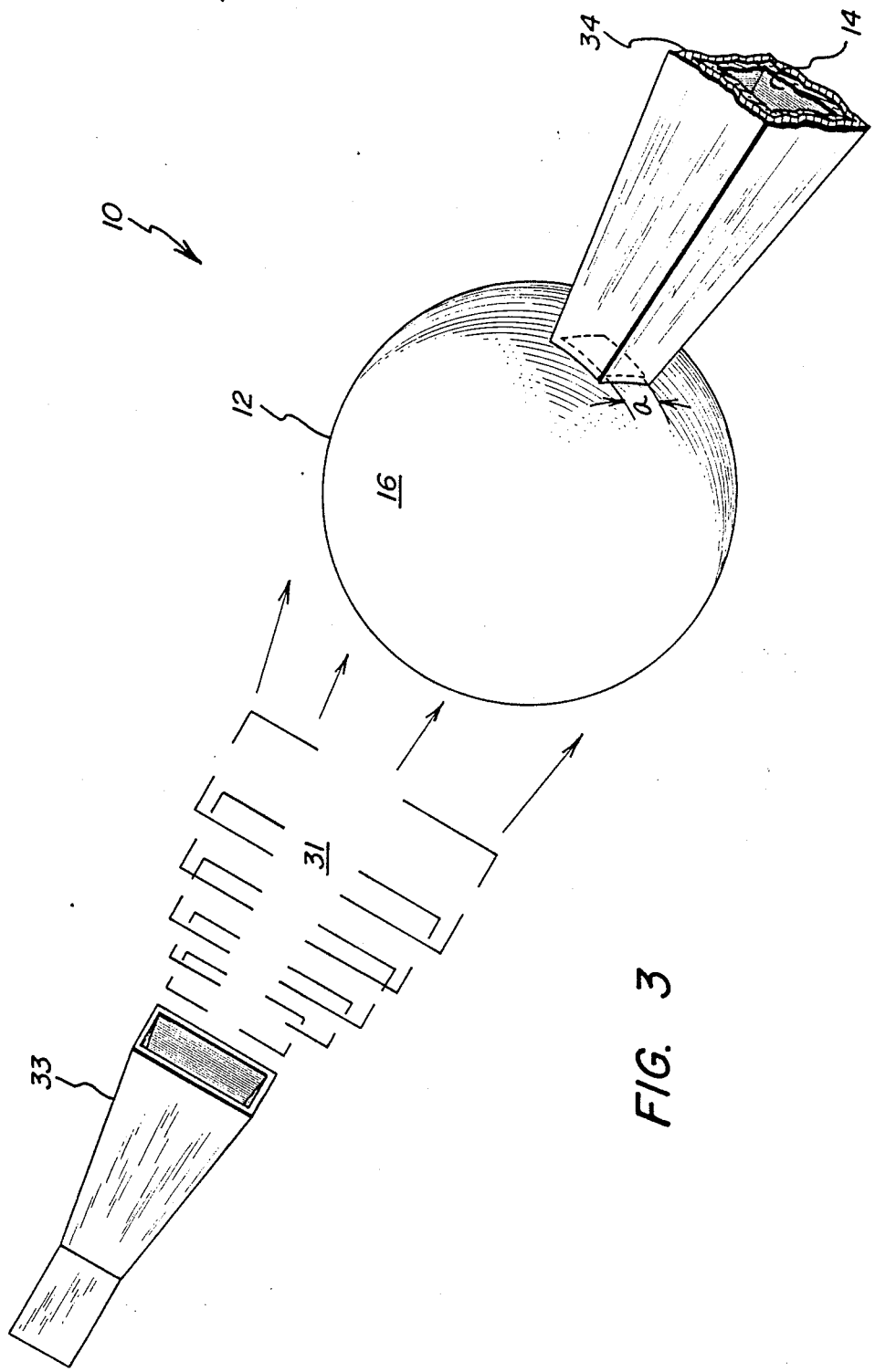
FIG. 3 is another alternate embodiment of the collimated light source of the present invention.

In the preferred embodiment of FIG. 1, envelope 16 is situated inside a coupling coil 24 which is electrically connected to the output of a radio frequency (RF) power supply 26. The coupling coil comprises wire or a cylindrical coil wrapped around the sphere. The RF power supply establishes a current in coupling coil 24, thus producing a RF magnetic field and inducing a discharge current in the fill which forms a light-emitting plasma. As a result, optical energy is radiated outward through lightguide 14 from envelope 16. Alternatively, the RF power supply may comprise a microwave energy source to energize the lamp, as illustrated in FIGS. 2 and 3. In the embodiment of FIG. 2, integrating sphere 16 is situated within a resonant microwave cavity 28. The cavity is coupled to a microwave energy supply 30 by a microwave waveguide 32 or by a coaxial cable (not shown). In operation, an electric field is established in cavity 28 which passes through envelope 16 to establish a discharge current in the fill, thereby producing a light-emitting plasma within the sphere that radiates light outward through lightguide 14.

FIG. 3 illustrates an alternate method of employing microwave energy to drive the lamp. This entails positioning the spherical envelope near the open end of a microwave waveguide 33 which is shaped to couple energy (designated by the numeral 31 in FIG. 3) from a microwave energy source (not shown) thereto. Still another suitable method of employing microwave energy (not shown) is to use a microwave cavity, which is constructed from electrically conducting material, as the integrating sphere in which case the cavity would contain the fill and would function as the lamp.

When microwave energy is used to drive lamp 12, lightguide 14 is preferably covered by an electrically conducting casing or piping 34, as shown in FIGS. 2 and 3, which operates as a "waveguide beyond cutoff". In such a waveguide, the largest dimension of its input end is sufficiently small to prevent microwave energy from propagating therethrough. That is, the cutoff wavelength of this waveguide, which is equal to twice the largest dimension thereof, is less than the excitation wavelength. Specifically, with reference to FIG. 3, the largest dimension of the waveguide beyond cutoff or casing 34, shown as the width, a, is less than one-half the excitation wavelength. To illustrate, for a typical $3 \times 10^9$ Hz microwave excitation frequency, the excitation wavelength may be calculated according to the well-known formula:

$$v = \lambda f$$

where $v$ is the velocity of the energy waves ($3 = 10^{10}$ cm/sec); f is the frequency ($3 = 10^9$/sec); and $\lambda$ is the excitation wavelength. For this illustration, the excitation wavelength ($\lambda$) is therefore 10 cm. Hence, the maximum width, a, of the casing should be less than one-half the excitation wavelength, or less than 5 cm, in order to prevent microwave energy from propagating through the lightguide.

Figure 4:
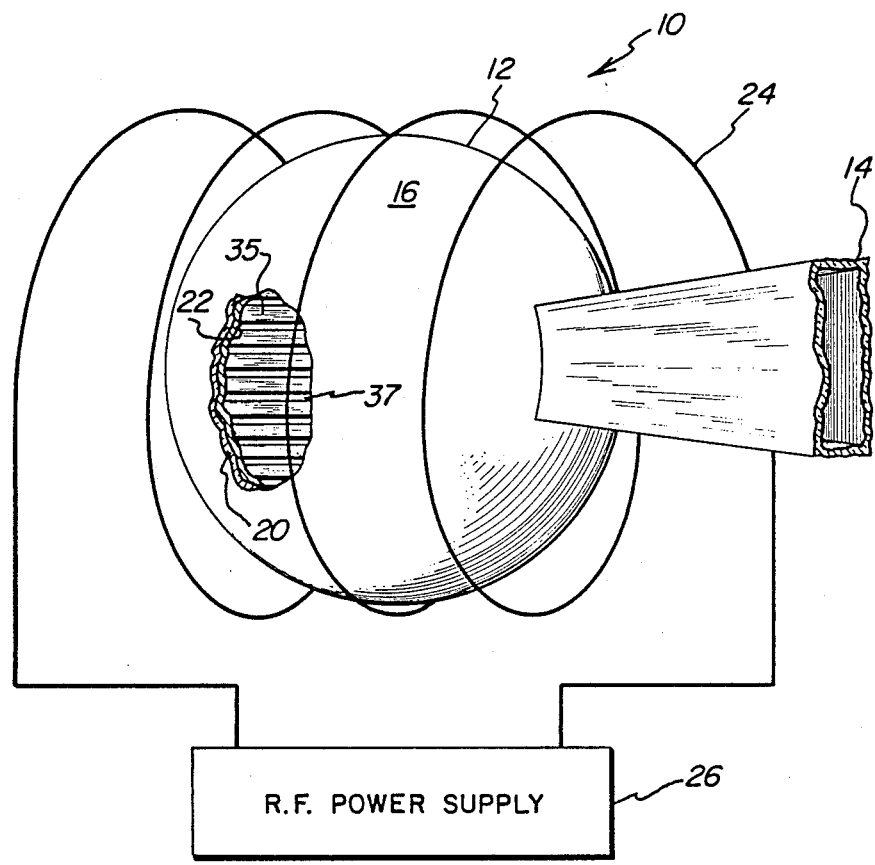
FIG. 4 is yet another alternate embodiment of the collimated light source of the present invention.

Although, as shown in FIGS. 1 and 2, coating 22 of integrating sphere 16 in the preferred embodiment is on the interior surface of the sphere, a light-reflective coating on the exterior surface of the sphere alternatively may be employed. Still further, to avoid inducing significant electric currents in the light-reflective coating if it is electrically conducting, such coating should be thin relative to the skin depth of the material employed at the excitation frequency. Skin depths of the above-mentioned suitable metals are approximately $2 = 10^{-3}$ cm at a typical 13.56 MHz operating frequency of the lamp utilizing a coupling coil excitation as shown in FIGS. 1 and 4. Therefore, an electrically conductive, light-reflective coating having a thickness of less than $2 = 10^{-3}$ cm is required. On the other hand, coating 22 could be applied to sphere 16 in parallel strips 35, as shown in FIG. 4, so that a gap (or gaps) 37 exists orthogonally with respect to the direction of the electric field about the sphere. The gap(s) prevents the formation of a closed circuit in the direction of the electric field, thus avoiding current flow in the coating due to the applied electric field.

One application for light source 10 is to illuminate a liquid crystal display, as shown in FIG. 2. In the illustrated system, the wide end of lightguide 14 is positioned adjacent to one side of a flat panel liquid crystal display 36. Flat panel liquid crystal displays are well-known and typically include a pair of flat panels 38,40 defining a volume 42 in which a quantity of liquid crystal materials, such as twisted nematic materials or dichroic dyes in a guest/host system, are contained. The interior surfaces of the flat panels generally include transparent electrode material. One panel may be covered with a single transparent ground plane electrode, while the other panel has an array of transparent pixel electrodes thereon. A voltage applied across the electrodes changes the optical properties of the liquid crystal material, thereby enabling the selective energization of pixels to display information on the liquid crystal display. Examples of liquid crystal displays are disclosed in U.S. Pat. No. 4,097,130 issued to H.S. Cole on June 27, 1988, U.S. Pat. No. 4,128,313 issued to H.S. Cole et al. on Dec. 5, 1978, and U.S. Pat. No. 4,581,608 issued to S. Aftergut et al. on Apr. 8, 1986, all the above cited patents being assigned to the instant assignee and further being incorporated by reference herein.

For an exemplary liquid crystal display application, the desired spectral output wavelength occurs in the region from 500–600 nanometers. As hereinbefore discussed, mercury and sodium are suitable fill materials.

Because the lamp of the present invention is designed to couple light from a discharge to a lightguide by acting as its own integrating sphere, the surface area of sphere 16 must be larger than the cross-sectional area of at the narrow input end of lightguide 14. For example, such a lamp may have a diameter of approximately 5 centimeters, yielding a surface area of 79 centimeters.

While the preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

What is claimed is:

1. An illuminated liquid crystal display system, comprising:
    a flat panel liquid crystal display;
    an electrodeless discharge lamp positioned to illuminate one side of said display, said lamp comprising a light integrating, closed container having an interior surface and an exterior surface, at least one of said surfaces being coated with a light-reflective material, said container enclosing a gaseous fill and having a light-transmissive window formed therein for permitting light to exit from said container;
    RF excitation means coupled to said integrating container for electrically producing a field to establish a discharge current in said fill; and
    an elongated, tapered lightguide means for emitting light from said container, said lightguide means having a narrow end and a wide end, the narrow end of said light-guide means being in registry with said window to intercept light exiting from said container, the wide end of said lightguide means being positioned adjacent to said liquid crystal display, whereby the light exiting from said container is guided from said container by said lightguide means and is emitted from the wide end thereof to illuminate said liquid crystal display.

2. The liquid crystal display system of claim 1 wherein said container comprises an integrating sphere.

3. The liquid crystal display system of claim 16 wherein said excitation means comprises:
    a coupling coil wrapped around said container; and
    a radio frequency power source coupled to said coil for producing a current in said coupling coil.

4. The liquid crystal display system of claim 1 wherein said excitation means comprises:
    a microwave energy source; and
    means for coupling said microwave energy source to said fill for driving said discharge current.

5. The liquid crystal display system of claim 4 wherein said means for coupling said microwave energy source to said fill comprises a resonant microwave cavity and means for coupling said cavity to said microwave energy source.

6. The liquid crystal display system of claim 5 wherein said means for coupling said cavity to said microwave energy source comprises a microwave waveguide.

7. The liquid crystal display system of claim 4 wherein said lightguide means further comprises an electrically conductive casing surrounding said lightguide means, the narrow end of said lightguide means having a width less than half the wavelength of said microwave energy source.

8. The liquid crystal display system of claim 1 wherein said fill comprises mercury.

9. The liquid crystal display system of claim 1 wherein said fill comprises sodium.

10. The liquid crystal display system of claim 1 wherein the interior surface of said sphere is coated with said light-reflective material.

11. The liquid crystal display system of claim 1 wherein the exterior of said sphere is coated with said light-reflective material.

12. The liquid crystal display system of claim 1 wherein said light-reflective material comprises magnesium oxide.

13. The liquid crystal display system of claim 1 wherein said light-reflective material is selected from the group of metals consisting of aluminum, copper, silver, and gold.

14. The liquid crystal display system of claim 13 wherein said coating comprises a plurality of substantially parallel strips of said light-reflective material, each of said strips encircling said sphere, said coating further comprising electrically insulating gaps between each of said strips, said gaps and said strips being substantially parallel to each other and substantially orthogonal to said electric field.

15. The liquid crystal display system of claim 13 wherein the thickness of said coating is less than one skin depth of said light-reflective material at the operating frequency of said excitation means.

16. A collimated light source, comprising:
    a light integrating, closed container having an interior surface and an exterior surface, at least one of said surfaces being coated with a light-reflective material, said container enclosing a gaseous fill and having a light-transmissive window formed therein for permitting light to exit from said container;
    an elongated, tapered lightguide means for emitting light from said container, said lightguide means having a narrow end and a wide end, the narrow end of said lightguide means being in registry with said window to intercept light exiting from said container, whereby the light exiting from said container is guided from said container by said lightguide means and is emitted from the wide end thereof; and RF excitation means coupled to said container for electrically producing a field to establish a discharge current in said fill.

17. The light source of claim 16 wherein said container comprises an integrating sphere.

18. The light source of claim 16 wherein said excitation means comprises:
a coupling coil wrapped around said container; and
a radio frequency power supply coupled to said coil for producing a current in said coupling coil.

19. The light source of claim 16 wherein said excitation means comprises:
a microwave energy source; and
means for coupling said microwave energy source to said fill.

20. The light source of claim 19 wherein said means for coupling said microwave energy source to said fill comprises a resonant microwave cavity and means for coupling said cavity to said microwave energy source.

21. The light source of claim 20 wherein said means for coupling said cavity to said microwave energy source comprises a microwave waveguide.

22. The light source of claim 19 wherein said lightguide means further comprises an electrically conductive casing surrounding said lightguide means, the narrow end of said lightguide means having a width less than half the wavelength of said microwave energy source.

23. The light source of claim 16 wherein said fill comprises mercury.

24. The light source of claim 16 wherein said fill comprises sodium.

25. The light source of claim 16 wherein the interior surface of said sphere is coated with said light-reflective material.

26. The light source of claim 16 wherein the exterior surface of said sphere is coated with said light-reflective material.

27. The light source of claim 16 wherein said light-reflective material comprises magnesium oxide.

28. The light source of claim 16 wherein said light-reflective material is selected from the group of metals consisting of aluminum, copper, silver, and gold.

29. The light source of claim 28 wherein said coating comprises a plurality of substantially parallel strips of said light-reflective material, each of said strips encircling said sphere, said coating further comprising electrically insulating gaps between each of said strips, said gaps and said strips being substantially parallel to each other and substantially orthogonal to said electric field.

30. The light source of claim 28 wherein the thickness of said coating is less than one skin depth of said light-reflective material at the operating frequency of said excitation means.

* * * * *